3,214,443
FLUORINE-CONTAINING CARBYL SULFATES AND THEIR PRODUCTION

Stanley Hsi-Kwei Chiang, Jersey City, and Horace R. Davis, Cedar Grove, N.J., assignors, by mesne assignments, to Minnesota Mining and Manufacturing Company, St. Paul, Minn., a corporation of Delaware
No Drawing. Original application Aug. 5, 1955, Ser. No. 526,769. Divided and this application May 17, 1963, Ser. No. 302,221
9 Claims.  (Cl. 260—327)

This is a division of application Serial No. 526,769, filed August 5, 1955, now abandoned.

This invention relates to new compositions of matter, that is fluorine-containing sultones and carbyl sulfates.

Over the years considerable interest has developed in the chemistry of fluorine-containing compounds. This interest is due to the unusual physical and chemical characteristics of the fluorine-containing compounds which charcteristics make then utilizable in applications where non-fluorinated compounds are useless. Because of the unpredictable behavior of the fluorine-containing compounds, their availability is rather limited and not too many classes are known.

It is an object of this invention to provide a class of compounds whose structure is novel.

It is another object of the present invention to provide a method for the preparation of these compounds.

It is another object of this invention to provide a class of compounds which can be used as chemical intermediates, surfactants, emulsifiers, anti-rust agents, heat transfer media, as an additive to electro-plating solutions, etc.

Various other objects and advantages of the present invention will become apparent to those skilled in the art from the accompanying description and disclosure.

In accordance with this invention, fluorine-containing sultones and carbyl sulfates are prepared by reacting fluorine-containing olefins and polyolefins with sulfur trioxide. The reaction involves the addition of at least one SO₃ group at the points of unsaturation of fluorinated organic compounds containing one or more double bonds. The reaction with sulfur trioxide yields a number of end products depending upon the reaction conditions employed as will become apparent hereinbelow. However, the principal products are the β-sultones which are characterized by the presence of a

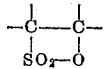

group and the carbyl sulfates which are characterized by the presence of a

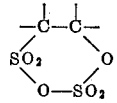

group. The β-sultones and carbyl sulfates which are produced by the reaction, are present in their isomeric and stereo-isomeric forms. The β-sultones under suitable conditions can be rearranged into acid halides and other sultones such as the γ and δ-sultones. Where polyolefinic starting compounds are employed, the sulfur trioxide reacts with the double bonds to form polysultones and polycarbyl sulfates having a plurality of the above described groupings. However, rearrangement of the double bonds can take place so as to produce sultones involving more than 4 atoms in the ring. Only rings containing an even number of members are formed initially in a conjugated system. Thus, the γ-sultone is a rearrangement of the β-form. Similarly 5, 7 and 9 membered rings are formed by rearrangement of even membered rings.

The sultonating agent used in preparing the new compounds of this invention, is sulfur trioxide which can be used in any of its physical forms, but which preferably is used in liquid form. As will become apparent hereinbelow, sulfur trioxide can be employed in a suitable inert solvent, such as ethylene dichloride, 1,1,2-trifluorotrichloroethane, etc., but only in the case of the more reactive starting materials. Preferably, sulfur trioxide is used without a solvent.

The unsaturated fluorine-containing compounds which are used as starting materials, are those compounds which have an aliphatic carbon chain. Preferably, the aliphatic carbon chain contains between 2 and 25 carbon atoms. Additionally, the aliphatic carbon chain contains at least one carbon to carbon double bond. The sulfur trioxide first adds to double bonds in the aliphatic chain and does not react readily with aromatic substituents. The presence of aryl groups of the chain is therefore possible. The preferred starting materials are the fluorine-containing perhalogenated alkenes, such as trifluorochloroethylene, tetrafluoroethylene, trifluorobromoethylene, dichlorohexafluorobutene (all isomers), chloropentafluoropropene (all isomers), trichlorofluoroheptene (all isomers), trichloroperfluoroheptene (all isomers), tetrachloroperfluorononene (all isomers), dichloroperfluorobutene (all isomers), pentachloroperfluorohendecene, and the conjugated and non-conjugated polyalkenes, such as trifluorobutadiene (all isomers), trifluoromethyl butadiene (all isomers), trichlorotrifluorobutadiene (all isomers), bromodifluoropentatriene (all isomers), hexachlorodifluorohexatriene (all isomers), octafluorohexatriene, and the halogenated aryl alkenes, such as trifluoromethyl styrene, etc., and the fluorine-containing cyclic alkenes, such as perfluorocyclobutene, 1,2-dichloroperfluorocyclopentene, 1,2-dichloroperfluorocyclohexene, perfluorocyclohexadiene-1,3, etc.

The reaction can be effected in a suitable corrosion-resistant apparatus, such as glass, monel, stainless steel, etc., by directly adding sulfur trioxide to the unsaturated fluorine-containing compound. Alternatively, the unsaturated fluorine-containing compound can be introduced to the sulfur trioxide. As indicated previously, the reaction can be carried out in the presence of an inert solvent, such as a saturated fluorocarbon (fluoroform, carbon tetrafluoride, a difluoroethane, etc.); a saturated chlorocarbon (chloroform, carbon tetrachloride, a dichloroethane, etc.); a saturated chlorofluoro carbon (dichlorodifluoromethane, 1,1,2 - trifluorotrichloroethane, etc.). Where a solvent is used, a molar ratio of solvent to sulfur trioxide of between about 0.25:1 and about 50.1 is employed, and preferably between about 0.5:1 and about 5:1. However, as indicated previously, the incorporation of the solvent is usually not essential to the reaction. A solvent is of some value in reactions involving the more reactive olefins, and in this connection, the solvent tends to reduce side reactions and aids in the dissipation of the heat of reaction, since the reactions are largely exothermic.

The molar ratio of a monomeric olefinic organic compound of the type described to sulfur trioxide is in the order of about 1:30 to about 30:1, preferably from about 1:5 to about 15:1, based on the formation of sultones. As the number of reaction centers (i.e., the number of double bonds) are increased, the sulfur trioxide concentration in the above ratios is correspondingly increased. Likewise, where carbyl sulfates are the desired reaction product, the sulfur trioxide concentration is increased so that the molar ratio of fluorinated starting material to sulfur trioxide is between about 1:100 and about 15:1 and preferably between about 1:20 and about 10:1 for each double bond.

The addition of sulfur trioxide can be carried out in suitable corrosion-resistant equipment, with or without agitation at temperatures ranging from between about —100° C. and about 200° C., and preferably between about —30° C. and about 50° C. for a period of time between about 15 minutes and about 6 weeks, and preferably not longer than 3 weeks. The reaction temperature is based on the relative reactivity of the fluorinated compound. Thus, where the fluorinated compound contains a sterically unhindered and readily polarizable double bond, the sultonation reaction can be carried out at temperatures ranging from room temperature down to about —100°. In the case of relatively reactive double bonds, operations at elevated temperatures, e.g., above room temperature, and lengthening of the reaction time tend to favor the formation of the carbyl sulfates. Where the fluorine-containing unsaturated starting compound contains less reactive double bonds the sultonation reaction is carried out above room temperature, that is up to about 200° under pressure. In general, increase of reaction time, temperature and pressure tend to favor the formation of carbyl sulfates. Although the product begins to form immediately, a substantial amount of product is not obtained before a one-half hour period has elapsed.

After the reaction is completed, unreacted alkene and excess $SO_3$ are removed by distillation or by a dry current of nitrogen gas. If the reaction is carried out with a solvent, the solvent is also removed by distillation. Solid products can be removed by filtration, sublimation, crystallization, or distillation.

The sulfur trioxide adds to the unsaturated starting materials at the double bond. When a compound containing more than one double bond is reacted, then the sulfur trioxide will react with the additional double bonds provided that a stoichiometric amount of sulfur trioxide is present. Thus, by selecting appropriate unsaturated starting materials, polysultones and polycarbyl sulfates can be prepared. Normally, 4 and 6 membered β- and δ-sultones are formed in the reaction but, by proper adjustment of operating conditions, i.e., pressure, temperature and mole ratio of sulfur trioxide, larger rings can be formed.

In order to illustrate methods by which the new compounds of this invention are prepared, the following examples are presented below in which analytical data substantiating the structural formulae of these compounds are given. It is to be understood that these examples are provided by way of illustration and are not to be considered as unnecessarily limiting the invention. The analytical data reported below, were obtained for those fractions which exerted a steady boiling point and refractive index.

EXAMPLE I

*Preparation of trifluorochloroethane sultone*

Sulfur trioxide (6 mls.—144 moles) was added directly over a period of 2.5 hours at room temperature to a saturated solution of approximately 125 grams—1.08 moles of trifluorochloroethylene in approximately 500 milliliters of 1,1,2-trichlorotrifluoroethane (Freon 113). The solution was kept saturated with trifluorochloroethylene overnight at room temperature. A fast current of dry nitrogen gas was bubbled through the solution with stirring for an hour to remove the gaseous components. The reaction mixture was then divided into two parts for fractionation. One part, approximately 36 percent of the total product was fractionated at atmospheric pressure. The results of the fractionation are tabulated below

FRACTIONATION AT ATMOSPHERIC PRESSURE

| Fraction | Boiling point, °C. | Amount | Refractive Index |
| --- | --- | --- | --- |
| I | 43.8–61 | 219.5 g | |
| II | 62–77 | 6.7 ml | 1.3628 (24.7° C.) |
| III | 77.2–88.5 | 4.0 ml | 1.3630 (24.5° C.) |
| IV | 90–122 | 10.6 ml | |
| V | Residue | 4 ml | |

With the exception of fraction one, which was principally the solvent Freon 113, all the liquid collected, fumed upon contact with air (moisture). The liquid reacted violently with water and with alcohols with the evolution of heat and was soluble in common organic solvents. Fraction two was analyzed as follows:

| | Found for Fraction II | Calculated for $C_2ClF_3SO_3$ |
| --- | --- | --- |
| Carbon | 12.13 | 12.22 |
| Hydrogen | 0.0 | 0.0 |
| Chlorine | 19.30 | 18.04 |
| Fluorine | 30.72 | 29.00 |
| Sulfur | 15.67 | 16.31 |
| Molecular weight | 196 | 196.55 |
| Neutral equivalent | 51 | 49.1 |

This corresponds to the compound trifluorochloroethane sultone

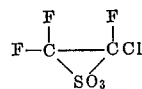

The higher boiling fractions contained trifluorochloroethane carbyl sulfate

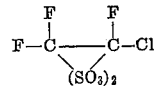

EXAMPLE II

*Preparation of trifluorochloroethane sultone*

Sulfur trioxide (113 grams, 1.42 moles) was added to liquid trifluorochloroethylene (265 grams, 2.27 moles) over a period of one hour with stirring in a Dry Ice cooled system. The resultant homogeneous solution had a temperature of 10° C. and was kept at this temperature for another two hours. Excess monomer was then allowed to escape over night. The crude product (272.8 grams, 1.38 moles) was fractionated at atmospheric pressure as follows:

FRACTIONATION OF THE REACTION PRODUCT OF $CF_2=CFCl$ AND $SO_3$ AT ATMOSPHERIC PRESSURE

| Fraction | Boiling point, °C. | Amount, ml. | Refractive Index (°C.) |
| --- | --- | --- | --- |
| I | 70–73 | 1 | |
| II | 73–75.7 | 40.6 | 1.3671 (20.5) |
| III | 75.7–76.2 | 78.0 | 1.3672 (20.0) |
| IV | 76.2–76.8 | 37.3 | |
| V | 76.2–105 | 16.6 | |
| VI | 103.5–105 | 8.1 | |
| VII | 105–119 | 20.6 | |
| Residue | | 30.0 | |

A sultone of good purity was obtained in 55.8 percent yield. The molecular formula $C_2FCl_3SO_3$ was firmly established by analysis as follows:

| | Found for Fraction III | Calculated for $C_2ClF_3SO_3$ |
|---|---|---|
| Chlorine | 18.04 | 18.04 |
| Fluorine | 29.00 | 29.00 |
| Sulfur | 16.30 | 16.31 |
| Neutral equivalent | 49.0 | 49.1 |

Carbon, hydrogen and molecular weight were established in the previous example. The total weight of fractions II, III and IV (155.9 g.—0.793 mole) represents a yield of 55.8 percent based on $SO_3$.

EXAMPLE III

*Preparation of 4,4-dichloroperfluorobutane-1,2-sultone*

4,4-dichloroperfluorobutene-1 (B.P. 66.9–69°, 67.2 grams, 0.288 mole) was treated with $SO_3$ (27.1 grams, 0.346 mole, 1:1.2 molar ratio) at room temperature for 3 days. The crude product (80.2 grams) was fractionated as follows:

| Fraction | Boiling point, °C. | Amount, grams | Refractive Index, 20° C. |
|---|---|---|---|
| I | 41–67 | 9.7 | |
| II | 67–68—119 | 15.13 | 1.3434 |
| III | 119–136 | 3.18 | 1.3708 |
| IV | 136–137 | 38.5 | 1.3738 |
| V | 137 | 4.40 | 1.3705 |
| Residue | | 7.0 | 1.3795 |

Fraction IV (38.50 grams, 0.122 mole) represents a 42.5 percent yield of 4,4-dichloroperfluorobutane sultone-1,2,

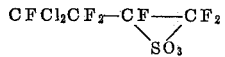

Analytical results for Fraction IV (B.P. 136–137°, $n_D^{20}$ 1.3738; $d^{24.2°}$ 1.773) were obtained and are tabulated below:

| | Found for Fraction IV | Calculated for $C_4Cl_2F_6SO_3$ |
|---|---|---|
| Carbon | 15.62 | 15.35 |
| Hydrogen | 0.00 | 0 |
| Chlorine | 23.68 | 22.65 |
| Fluorine | 33.30 | 36.42 |
| Sulfur | 9.55 | 10.25 |
| Molecular weight | 308 | 313.02 |

EXAMPLE IV

*Preparation of 2,3-dichloroperfluorobutane-2,3-sultone and 2,3-dichloroperfluorobutane-2,3-carbyl sulfate*

A mixture of sym.-dichloroperfluorobutene $$CF_3CCl=CClCF_3$$

(204 grams, 0.875 mole) and $SO_3$ (75 ml., 140 grams, 1.75 moles, 1:2 molar ratio) was kept at 40 to 45° C. for 13 days. The crude product was fractionated as follows:

| Fraction | Boiling point, °C. | Refractive Index (° C.) | Weight, grams | Remarks |
|---|---|---|---|---|
| I | 41.8–75 | | 66.0 | |
| II | 42.5–105 | 1.3850(22.4) | 22.7 | Second day of fractionation. |
| III | 105–116 | 1.3768(22.4) | 21.5 | |
| IV | 116–132 | 1.3729(22.0) | 21.9 | |
| V | 132–133.8 | 1.3740(22.0) | 24.0 | |
| VI | 133.8–132 | 1.3740(22.0) | 21.4 | Analysis below. |
| VII | 132.8–133.5 | 1.3740(22.0) | 21.7 | |
| VIII | 133.5–134 | 1.3750(22.0) | 18.0 | |
| IX | 135–136.8 | 1.3768(22.2) | 28.7 | |
| X | 43–134 | | (1.5 ml.) | Third day of fractionation. |
| XI | 135–137.5 | 1.3768(22.2) | 22.8 | |
| XII | 134–179 | 1.3938(20.0) | 25.0 | Fourth day of fractionation. |
| XIII | 179.5–192.5 | 1.3985(20.0) | 12.9 | Separation of a small amount of colorless prismatic plates. |
| XIV | 192.5–194.5 | 1.3969(20.0) | 24.6 | |
| XV | 194 | 1.3959(20.0) | 8.8 | Analysis below. |
| Residue | | | (2.5 ml.) | |

Fraction VI was analyzed for the sulton (I) and Fraction XV was analyzed for the carbyl sulfate (II):

| | $CF_3$—$CCl$—$CCl$—$CF_3$ $\diagdown\;\;\diagup$ $O$—$SO_2$ (I) | | $CF_3$—$CCl$—$CCl$—$CF_3$ $O\diagup\;\;\diagdown SO_2$ $SO_2$—$O$ (II) | |
|---|---|---|---|---|
| nalysis | Calculated for $C_4Cl_2F_6SO_3$ | Found for Fraction VI | Calculated for $C_4Cl_2F_6S_2O_6$ | Found for Fraction XV |
| Carbon | 15.35 | 12.15 | 12.23 | 12.14 |
| Hydrogen | 0 | 0.00 | 0 | 0.00 |
| Chlorine | 22.65 | 19.59 | 18.05 | 17.87 |
| Fluorine | 36.42 | 36.38 | 29.00 | 28.41 |
| Sulfur | 10.25 | 12.62 | 16.31 | 15.53 |
| Oxygen | 15.33 | | 24.42 | 24.48 |
| Molecular weight | 313.02 | 334 | 393.08 | 425 |
| Saponification equivalent | 78.2 | 79 | | |

Fractions IV–XI (158.5 grams, 0.523 mole) represents a 59.8 percent yield of the sultone (I). Fractions XII–XV (71.3 grams, 0.181 mole) represents a 20.7 percent yield of the carbyl sulfate (II).

EXAMPLE V

*Preparation of 4,4-dichloroperfluorobutane-1,2 sultone and 4,4-dichloroperfluorobutane-1,2 carbyl sulfate*

$SO_3$ (54 ml., 1.27 moles) was added to 4,4-dichloroperfluorobutene-1, $CFCl_2$—$CF_2$—$CF$=$CF_2$ (156.8 grams; 0.703 mole) over a 15 minute period at room temperature. The system was maintained at 40–45° C. for 18 hours and the crude product, weighing 231.1 grams, was fractionated.

| Fraction | Boiling point, °C. | Weight of sample, grams | Refractive Index (20° C.) |
|---|---|---|---|
| I | 37–80 | 20.3 | |
| II | 80–122.3 | 27.9 | 1.3803 |
| III | 122.3–122.5 | 20.1 | 1.3711 |
| IV | 123–126 | 22.2 | 1.3715 |
| V | 124–127.5 | 20.4 | 1.3722 |
| VI | 127–124 | 17.8 | 1.3721 |
| VII | 118–129 | 20.9 | 1.3715 |
| VIII | 129–131.5 | 20.2 | 1.3720 |
| IX | 131–140 | 12.1 | 1.3741 |
| X | 140–135 | 1.5 | 1.3802 |
| XI | 140–162 | 14.2 | 1.3877 |
| XII | 163–166 | 20.5 | 1.3879 |
| XIII | 160–150 | 4.2 | 1.3890 |
| Residue | 3–4 cc. | | |

Fraction VIII was analyzed for the sultone (I) and Fraction XII was analyzed for the carbyl sulfate (II) as follows:

| | $CFCl_2CF_2CF$—$CF_2$ $\diagdown\;\;\diagup$ $SO_3$ (I) | | $CFCl_2CF_2CF$—$CF_2$ $\diagdown\;\;\diagup$ $(SO_3)_2$ (II) | |
|---|---|---|---|---|
| | Calculated for $C_4Cl_2F_6SO_3$ | Found for Fraction VIII | Calculated for $C_4Cl_2F_6S_2O_6$ | Found for Fraction XII |
| Carbon | 15.35 | 15.36 | 12.23 | 12.67 |
| Hydrogen | 0 | 0.00 | 0 | 0.00 |
| Chlorine | 22.65 | 12.28 | 18.05 | 17.64 |
| Flourine | 36.42 | 38.00 | 29.00 | 26.61 |
| Sulfur | 10.25 | 10.67 | 16.31 | 15.91 |
| Oxygen | | | 24.42 | 23.40 |
| Molecular weight | 313.02 | 338 | 393.08 | 408 |

EXAMPLE VI

*Preparation of 4,6,7-trichloroperfluoroheptane-1,2 sultone*

Sulfur trioxide (60 ml., 1.42 moles) was added with stirring over a period of 50 minutes at 1° C. to a solution of 4,6,7-trichloroperfluoroheptene-1

$CF_2Cl(CFClCF_2)_2CF=CF_2$ (232 grams, 1.70 moles) in Freon 113 (150 ml.); the system was heated at 40° C. for an additional hour. After removal of unreacted $SO_3$, the crude product was fractionated as shown below:

| Fraction | Boiling point, °C./ pressure, mm. | Refractive index (20° C.) | Weight, grams |
|---|---|---|---|
| 1 | 20-27/0.1-0.8 | 1.3642 | 18.65 |
| 2 | 28-32/0.5-0.12 | 1.3650 | 19.44 |
| 3 | 32-36/0.1-0.11 | 1.3675 | 12.00 |
| 4 | 37-58/0.1-0.18 | 1.3789 | 21.91 |
| 5 | 56/0.18 | 1.3800 | 1.32 |

Evidently the reaction between the perchlorofluoroheptene and sulfur trioxide is slow as the fractionated product is mainly the unreacted perchlorofluoroheptene ($n_D^{20}$ 1.3638 for starting material).

The recovered perchlorofluoroheptene (162 g., 0.402 mole) from the above experiment was then further treated with $SO_3$ (0.402 mole) without a solvent. The homogeneous mixture was heated at 50° C. for 4 hours and allowed to stand over the week-end. After removal of a small amount of unreacted $SO_3$, the crude product was fractionated as follows:

| Fraction | Boiling point, °C./ pressure, mm. | Refractive index (20° C.) | Weight, grams |
|---|---|---|---|
| I | 23.5-52/0.18-0.2 | 1.3715 | 20.00 |
| II | 52.5-61/0.2-0.22 | 1.3790 | 26.60 |
| III | 62-68/0.25-0.22 | 1.3802 | 27.92 |
| IV | 69-72.5/0.22 | 1.3802 | 30.75 |
| V | 72.8-75/0.22 | 1.3806 | 28.35 |
| VI | 74/0.22-0.3 | 1.3806 | 2.90 |
| Residue | | | None |

Fraction IV was analyzed for the trichloroperfluoroheptane sultone $CF_2Cl(CFClCF_2)_2CFCF_2SO_3$ as follows:

| | Found for fraction IV | Calculated for $C_7Cl_3F_{11}SO_2$ |
|---|---|---|
| Carbon | 17.63 | 17.53 |
| Hydrogen | 0.00 | 0.00 |
| Chlorine | 22.10 | 22.17 |
| Fluorine | 43.56 | 43.57 |
| Sulfur | 6.77 | 6.68 |
| Molecular weight | 496 | 479.1 |

The combined weight of Fractions 2 to 6 (116.4 g., 0.242 mole) represented a yield of 60.3% based on the heptene.

EXAMPLE VII

*Preparation of 4,6,7-trichloroperfluoroheptane-1,2-sultone*

An improved yield of $CF_2Cl(CFClCF_2)_2CFCF_2SO_3$ (200 grams, 0.417 mole, 77.5 percent yield) was obtained when 4,6,7-trichloroperfluoroheptene-1 (215 grams, 0.538 mole) was treated with an excess of sulfur trioxide (86 grams, 1.076 moles) at 40° C. for 20 hours. The fractions are reported below.

| Fraction | Boiling point, °C./ pressure, mm. | Refractive index (20° C.) | Weight, grams |
|---|---|---|---|
| I | 21.5-46/0.45-0.22 | 1.3702 | 33.3 |
| II | 43-58/0.15-0.25 | 1.3797 | 6.8 |
| III | 59/0.22 | 1.3800 | 48.80 |
| IV | 58-56/0.22-0.20 | 1.3800 | 50.20 |
| V | 56/0.20-0.15 | 1.3800 | 49.70 |
| VI | 56/0.15-0.17 | 1.3800 | 51.30 |
| Residue | | | None |

EXAMPLE VIII

*Preparation of 4,6,8,9-tetrachloroperfluorononane-1,2 sultone*

A mixture of 4,6,8,9-tetrachloroperfluorononene-1 (205 g., 0.397 mole) and sulfur trioxide (79 g., 1:2.5 molar ratio) was maintained at a temperature of about 40-45° for 90 hours, after which the excess sulfur trioxide was removed at reduced pressure. The crude product weighed 261.9 grams and was fractionated as follows:

| Fraction | Boiling point, °C./ pressure, mm. | Refractive index (°/C.) | Weight, grams |
|---|---|---|---|
| I | 20-74/.07-.08 | 1.3838(20.5) | 16.70 |
| II | 74-82/.08 | 1.3879(20.5) | 36.80 |
| III | 81-82/.08 | 1.3893(20.0) | 39.15 |
| IV | 82.5-85/.08 | 1.3908(20.2) | 47.90 |
| V | 85-92/.08-.09 | 1.3945(20.5) | 49.00 |
| VI | 92-101.7/.09-0.1 | 1.4041(20.4) | 46.50 |
| Residue | | | (2-3 ml.) |

The analyses of Fraction III, shown below, check with the formula $CF_2Cl(CFClCF_2)_3CFCF_2SO_3$. Fractions II to V (172.9 grams, 0.29 mole), represent a yield of 73 percent.

| Analyses | Calculated for $C_9Cl_4F_{14}SO_9$ | Found for Fraction III |
|---|---|---|
| Carbon | 18.14 | 17.80 |
| Hydrogen | 0 | 0.00 |
| Chlorine | 23.79 | 23.72 |
| Fluorine | 44.63 | 43.62 |
| Sulfur | 5.38 | 5.18 |
| Molecular weight | 595.99 | 613 |

EXAMPLE IX

*Preparation of 4,6,8,10,11-pentachloroperfluorohendecane-1,2 sultone*

A mixture of 4,6,8,10,11-pentachloroperfluorohendecene-1, $CF_2Cl(CFClCF_2)_4CF=CF_2$ (248.7 g., 0.393 mole) and sulfur trioxide (42 ml., 0.98 mole) was kept at 45° C. for 27 hours. The excess $SO_3$ was removed by a current of dry $N_2$. The crude product (296.0 grams) was fractionated as follows:

| Fraction | Boiling point, °C./ pressure, mm. | Refractive index (20° C.) | Amount, grams |
|---|---|---|---|
| I | 90-115/0.5-0.45 | 1.3914 | 24.9 |
| II | 115-116/0.45-0.40 | 1.3940 | 42.6 |
| III | 115-116/0.40 | 1.3949 | 39.8 |
| IV | 116.5-119.5/0.40-0.47 | 1.3949 | 47.0 |
| V | 119.9-124/0.5-0.55 | 1.3968 | 52.6 |
| VI | 125-133/0.55-0.7 | 1.4047 | 48.4 |
| Residue | | | (2-3 ml.) |

Fraction III of the product 4,6,8,10,11-pentachloroperfluorohendecane sultone-1,2 $CF_2Cl(CFClCF_2)_4CFCF_2SO_3$ was analyzed as follows:

| | Calculated for $C_{11}Cl_5F_{17}SO_3$ | Found for Fraction III |
|---|---|---|
| Carbon | 18.53 | 18.27 |
| Hydrogen | 0 | 0.00 |
| Chlorine | 24.88 | 24.78 |
| Fluorine | 45.34 | 45.00 |
| Sulfur | 4.50 | 4.26 |
| Molecular weight | 712.47 | 701 |

The sultones of this invention can be hydrolyzed with alkali and alkaline earth metal hydroxides to form the corresponding salts. Depending on the position of the $SO_3$ group in the chain, either carboxylates or ketones are produced. Thus, where the $SO_3$ group is in the 1,2 position and the sulfur is on the No. 2 carbon a carboxylate is formed. Where the $SO_3$ group is in the 1,2 position and the sulfur is on the No. 1 carbon a ketone is produced. Where the $SO_3$ group is in any position other than at the end of a chain, a ketone is produced. The following equations in which a stoichiometric amount of sodium hydroxide is employed, illustrates this point:

(I)

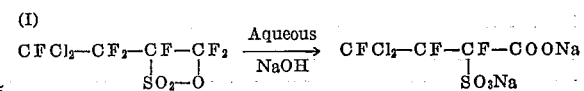

(II)

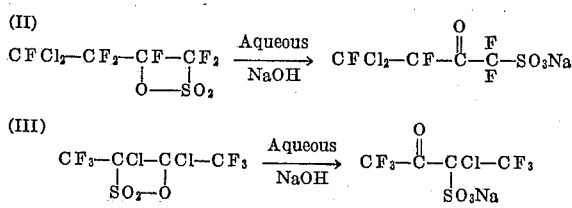

(III)

$$CF_3-CCl-CCl-CF_3 \xrightarrow[\text{NaOH}]{\text{Aqueous}} CF_3-\overset{O}{\overset{\|}{C}}-CCl-CF_3$$
$$\phantom{CF_3-}|\phantom{CCl-}|\phantom{CC}\phantom{CF_3}\phantom{aa}\phantom{CF_3-C-}|$$
$$\phantom{CF_3-}SO_2-O\phantom{CF_3}\phantom{aaaaaa}\phantom{CF_3-C-}SO_3Na$$

EXAMPLE X

This example illustrates the preparation of the sodium salt of 4,6,7-trichloroperfluoroheptane-1,2-sultone $$CF_2Cl(CFClCF_2)_2CFCF_2SO_3$$

A solution of 7.5 grams of NaOH in 100 cc. $H_2O$ was added with stirring to 22.3 grams of 4,6,7-trichloroperfluoroheptane-1,2-sultone. The water was removed under reduced pressure at a temperature under 50° C. The white crystals thus obtained (22 grams) were the sodium salt derived from $CF_2Cl(CFClCF_2)_2CFCF_2SO_3$.

EXAMPLE XI

The sodium salt derived from 4,6,8,9-tetrachloroperfluorononane-1,2 - sultone $CF_2Cl(CFClCF_2)_3CFCF_2SO_3$ was prepared using the procedure of Example XII:

EXAMPLE XII

By reacting a stoichiometric amount of sodium hydroxide with trifluorochloroethylene sultone, 2,3-dichloroperfluorobutane-2,3 sultone, 4,4-dichloroperfluorobutane-1,2 sultone, and 4,6,8,10,11-pentachloroperfluorohendecane-1,2 sultone, the corresponding sodium derivatives are formed.

EXAMPLE XIII

By reacting a stoichiometric amount of lithium hydroxide, potassium hydroxide, strontium hydroxide and barium hydroxide in aqueous solution with trifluorochloroethane sultone, 2,3 - dichloroperfluorobutane-2,3 sultone, 4,4-dichloroperfluorobutane-1,2 sultone, 4,6,7-trichloroperfluoroheptane-1,2 sultone, 4,6,8,9-tetrachlorofluorononane-1,2 sultone, and 4,6,8,10,11-pentachloroperfluorohendecane-1,2 sultone, the corresponding salt derivatives are formed.

EXAMPLE XIV

This example demonstrates the ability of the compounds of this invention to lower the surface tension ($\gamma$) of water. Because of this ability, the sultones and the carbyl sulfates are excellent surfactants. In the table below, surface tension measurements were made using a Du Nouy Tensiometer.

Compound (1% in water)     $\gamma$ in dynes cm.$^{-1}$
- Dried sodium salt derived from 4,6,7-trichloroperfluoroheptane-1,2-sultone _____ 45.7
- Dried sodium salt derived from 4,6,8,9-tetrachloroperfluorononane-1,2-sultone _____ 30.5
- Aqueous sodium hydroxide+4,6,8,9-tetrachloroperfluorononane-1,2-sultone _____ 34.5
- Water+4,6,8,9 - tetrachloroperfluorononane-1,2-sultone _____ 32.2
- Water+4,6,7-trichloroperfluoroheptane-1,2-sultone _____ 39.6
- Water+4,6,8,9-tetrachloroperfluorononane-1,2-carbyl sulfate _____ 28.2

As indicated previously, the sultones, carbyl sulfates and the alkali and alkaline earth metal derivatives of the sultones are useful as emulsifiers in aqueous polymerization systems. These compounds have particular utility in the aqueous polymerization of perfluorochloroolefins, such as trifluorochloroethylene and in the copolymerization of perfluorochloroolefins, with other hydrogen-containing halogenated olefins, such as vinyl fluoride, vinylidene fluoride, vinyl chloride, and vinylidene chloride. When used as emulsifiers in emulsion polymerization systems, the sultone, the salts derived from the sultones and the carbyl sulfates are used in an amount between about 0.1 and about 10 percent by weight and preferably between about 1 and about 5 percent by weight based on water. The following examples illustrate the use of these compounds in polymerization systems.

EXAMPLE XV

This example illustrates the use of sultones as emulsifiers in the aqueous polymerization of trifluorochloroethylene.

Into a polymerization tube was added, 1.875 grams of $CF_2Cl(CFCl-CF_2)_3CFCF_2SO_3$, 1 gram of $K_2S_2O_8$, and 41.7 grams of chlorotrifluoroethylene monomer. The system contained 125 grams of water. The tube was agitated by a head-to-tail motion for a period of 20 hours at 25° C. under autogeneous pressure. After the reaction was complete, the polymer was removed from the tube in 8.0 percent yield.

EXAMPLE XVI

This example illustrates the use of sodium salt of the sultone used in Example XV as an emulsifier in the aqueous polymerization of trifluorochloroethylene.

Into a polymerization tube was added, 1.875 grams of the sodium salt derived from $$CF_2Cl(CFClCF_2)_3CFCF_2SO_3$$

2 grams of disodium phosphate (buffer), 1 gram of $K_2S_2O_8$, and 41.7 grams of chlorotrifluoroethylene monomer. The system contained 125 grams of water. The tube was then agitated by a head-to-tail motion for a period of 20 hours at 25° C. under autogeneous pressure. After the reaction was complete, the polymer was removed from the tube in 25 percent yield.

EXAMPLE XVII

This example illustrates the effectiveness of the sultones in emulsion polymerization systems.

The recipe given in Example XV was employed except that 1,875 grams of polyoxyethylene sorbitan mono stearate (Tween 60) was substituted for the sultone. Trace quantities of the polymer were produced.

EXAMPLE XVIII

This example illustrates the effectiveness of the sultones of this invention in emulsion polymerization systems.

The polymerization described in Example XV was repeated using the recipe given therein except that no emulsifier was added. Only trace quantities of polymer were produced.

EXAMPLE XIX

This example illustrates the use of the sultones of this invention, in the emulsion copolymerization of trifluorochloroethylene and vinylidene fluoride.

Into a steel bomb was charged 1.0 gram of the sodium salt of 4,6,7 - trichloroperfluoroheptane - 1,2 - sultone, 5.0 grams of sodium persulfate, 4 grams of disodium phosphate, 200 parts of water and a mixture of trifluorochloroethylene and vinylidene fluoride (27/73 mole ratio). The steel bomb was maintained at a pressure of 200 p.s.i. and a temperature of 35° C. for about 6 hours. At the end of this time the conversion to copolymer was 26 percent.

EXAMPLE XX

This example illustrates the effectiveness of the sultones of this invention in emulsion copolymerization systems. The copolymerization of Example XIX was repeated using the recipe described therein but omitting the sodium salt of the sultone. Without the sodium salt of the sultone, less than 5 percent conversion to copolymer was realized.

EXAMPLE XXI

Trifluorochloroethane sultone, dichloroperfluorobutane sultone, trichloroperfluoroheptane sultone, pentachloroperfluorohendecane sultone, are substituted for the tetrachloroperfluorononane sultone, used in the recipe of Example XV. Good yields of polymer are obtained.

EXAMPLE XXII

The sodium salts of the sultones, described in the preceding Example XXI are substituted for the sodium salt derived from tetrachloroperfluorononane sultone used in Example XVI. Good yields of polymer are obtained.

EXAMPLE XXIII

Trifluorochloroethane carbyl sulfate, dichloroperfluorobutane carbyl sulfate, trichloroperfluoroheptane carbyl sulfate, tetrachloroperfluorononane carbyl sulfate and pentachloroperfluorohendecane carbyl sulfate are substituted for the tetrachloroperfluorononane sultone used in Example XV. Good yields of polymer are obtained.

Some of the olefinic starting materials which can be reacted with sulfur trioxide are also new compounds. For purposes of clarity, the method for preparing these new compounds is described hereinbelow. The new compounds are the perfluorohaloolefinic compounds which are derived by appropriate reaction of a saturated perfluorohalo compound. These saturated perfluorohalo compounds are prepared by telomerizing an appropriate perfluorohaloethylenic starting material using a sulfuryl halide telogen. Representative of the perfluorohaloethylenic starting materials are tetrafluoroethylene, trifluorochloroethylene, symmetrical and unsymmetrical dichlorodifluoroethylene and trichlorofluoroethylene. Since the highly fluorinated sultones and carbyl sulfates are preferred, the preparation of the highly fluorinated starting materials is illustrated below, although by employing different starting materials with proper adjustment of the reaction temperature, a variety of telomeric products can be obtained.

As a specific example illustrating the preparation of the fluorohalocarbon telomer products which are used in preparing the preferred olefins, e.g., by dehalogenation, 9.93 grams of benzoyl peroxide and 24 grams of sulfur dioxide are dissolved in 115 ml. of carbon tetrachloride and 325 ml. of sulfuryl chloride. To this mixture, 440 ml. of trifluorochloroethylene monomer are added and the system is heated to about 95° C. for a period of 4 hours at a pressure of 350 pounds per square inch gage with agitation to produce a high yield of relatively low molecular weight polymer. The telomeric product is relatively easy to separate into its individual compounds by distillation since it contains only compounds having an even number of carbon atoms so that each compound has a boiling point relatively far removed from that of the next lower or next higher compound. The formula of these telomer products of trifluorochloroethylene and sulfuryl chloride is the following:

$$Cl(CF_2CFCl)_nCl$$

wherein $n$ is an integer between about 2 and about 16.

The physical characteristics of some of the individual telomer products and of the mixtures of such products which are used in preparing the olefin starting materials are given in the following Table I and Table II, respectively.

TABLE I.—PHYSICAL PROPERTIES OF INDIVIDUAL TRIFLUOROCHLOROETHYLENE SULFURYL CHLORIDE TELOMER PRODUCTS

| Individual telomer products | Boiling Point, °C. | Index of Refraction ($n_D^{20}$) |
|---|---|---|
| (1) Cl—(CF$_2$—CFCl)$_2$—Cl | 134 | 1.3820 |
| (2) Cl—(CF$_2$—CFCl)$_3$—Cl | 203 | 1.3956 |
| (3) Cl—(CF$_2$—CFCl)$_4$—Cl | 255 | 1.4018 |
| (4) Cl—(CF$_2$—CFCl)$_5$—Cl | 300 | 1.4024 |
| (5) Cl—(CF$_2$—CFCl)$_6$—Cl | 335 | 1.4110 |

TABLE II.—PHYSICAL PROPERTIES OF MIXTURES OF TRIFLUOROCHLOROETHYLENE-SULFURYL CHLORIDE TELOMER PRODUCTS

| Telomer oil fraction | Boiling range, °C. at 0.5 mm. | Approximate molecular weight | Density | | Viscosity cs. | | Melting point, °F. |
|---|---|---|---|---|---|---|---|
| | | | 100° F. | 210° F. | 68° F. | 130° F. | |
| 1 | 20–95 | 460 | 1.823 | 1.720 | 4.0 | | |
| 2 | 95–132 | 570 | 1.862 | 1.768 | 12.3 | 3.7 | |
| 3 | 132–170 | 680 | 1.910 | 1.823 | 108 | 14.4 | |
| 4 | 170–207 | 800 | 1.940 | 1.853 | a 2.07 | b 8.9 | |
| 5 | 207–245 | 1,000 | 1.962 | 1.873 | a 1,578 | b 27.2 | 88 |
| 6 | 245 | 1,500 | | | | b 371.6 | 175 | a At 100° F. b At 210° F.

The above described telomeric compounds contain an even number of carbon atoms in the chain. Where an even numbered olefin is desired the telomer can be dehalogenated using triethyl phosphite as a dehalogenating agent. The following examples illustrate the preparation of perfluorohaloolefinic compounds having an even number of carbon atoms.

EXAMPLE XXIV

Preparation of 4,4-dichlorohexafluorobutene-1

The perfluorochlorobutane employed in this example was the telomer dimer product referred to as Product (1) of Table I above, obtained by telomerizing trifluorochloroethylene in the presence of sulfuryl chloride using benzoyl peroxide as the promoter at a temperature of 95° C. for a period of 4 hours.

To a 500 ml. round bottom flask equipped with a magnetic stirrer, a dropping funnel and a Friedrichs condenser which, in turn, was attached to a bubbler and cold trap maintained at a temperature of −68° C., there was charged 357 grams (1.17 mol) of 1,2,4,4-tetrachlorohexafluorobutane having a boiling point of 134° C. and an index of refraction ($n_D^{20}$) of 1.3820. The contents of the flask were then heated to 130° C. after which 105.5 grams (0.63 mol) of triethyl phosphite were added dropwise over a period of 3 hours. The heating was continued for an additional period of 1 hour after which time the generation of gas had ceased. The cold trap was found to contain only liquefied ethyl chloride (25.6 grams).

The Friedrichs condenser fitted to the reaction flask was replaced with a Vigreux distillation column and the reaction product was distilled. A fraction (52.8 grams) boiling between about 60° C. and about 80° C. was collected. This fraction was further purified by redistillation to yield a fraction having a boiling point of 67–68° C., an index of refraction ($n_D^{20}$) of 1.3424 and a density ($D_4^{20}$) of 1.6192. The molar refractivity of this product was found to be 30.25. The calculated molar refractivity for $C_4F_6Cl_2$ is 30.22. Infra-red analysis of the product showed an absorption band at 5.57 microns indicative of the CF$_2$=CF— group. The product thus obtained was identified as 4,4-dichlorohexafluorobutene-1.

EXAMPLE XXV

*Preparation of 4,6,8,8-tetrachloroperfluorooctene-1*

The perfluorochlorooctane employed in this example was the telomer tetramer product, referred to as Product (3) of Table I above, obtained by telomerizing trifluorochloroethylene in the presence of sulfuryl chloride and benzyl peroxide at a temperature of 95° C. for a period of 4 hours.

To a 150 ml. round bottom flask fitted with a stirrer and an air cooled condenser which, in turn, was connected to a bubbler and cold trap maintained at a temperature of −80° C., there were charged 100.3 grams of 1,2,4,6,8,8-hexachloroundecafluorooctane having a boiling point of 255° C. and an index of refraction ($n_D^{20}$) of 1.4018, and 17.4 grams of triethyl phosphite. The reaction mixture was heated to 130° C. and maintained at this temperature for a period of 1 hour after which time no further evolution of gas was observed. Ethyl chloride (5 grams) was the only product identified in the contents of the cold trap. The reaction mixture in the reaction flask was purified by fractional distillation to obtain an olefinic product having a boiling point of 60°–62° C. at 10 mm. mercury pressure and an index of refraction ($n_D^{20}$) of 1.3788. The product is identified as the tetrachloroperfluorooctene having the formula:

$$CF_2=CF-(CF_2CFCl)_3-Cl$$

EXAMPLE XXVI

*Preparation of 4,6,8,10,10-pentachloroperfluorodecene-1*

The perfluorochlorodecane employed in this example was the telomer pentamer product, referred to as Product (4) of Table I above, obtained by telomerizing trifluorochloroethylene in the presence of sulfuryl chloride and benzyl peroxide at a temperature of 95° C. for a period of 4 hours.

To a one liter flask fitted with a magnetic stirrer and an air-cooled condenser which, in turn, was attached to a bubbler and a cold trap maintained at a temperature of −68° C. there were added 653 grams (1 mol) of telomer pentamer having a boiling point of 300° C. and an index of refraction ($n_D^{20}$) of 1.4024, and 332 grams (2 mols) of triethyl phosphite. The mixture was heated to 75° C. at which temperature a vigorous evolution of gas was observed. After about 1 hour of heating at this temperature the reaction rate decreased, heat was applied to bring the temperature of reaction up to 150° C. and this temperature was maintained for an additional period of 2 hours. The gaseous product which liquefied in the cold trap was found to contain 97 grams of ethyl chloride and 30 grams of ethyl fluoride.

The reaction mixture remaining in the flask was extracted seven times with 100 milliliter portions of 5 percent aqueous potassium hydroxide accompanied by slight warming of the solution mixture with each extraction. A total of 301 grams of material was removed in the aqueous extract. The remaining non-soluble oil (578 grams) was washed with water, then dried and fractionally distilled through a Vigreux column. Various liquid fractions were obtained and only those which gave a positive potassium permanganate test were combined and redistilled through a spinning band distillation column. A total of 113 grams of olefinic material was obtained. Further purification of this material by redistillation gave a fraction having a boiling point of 55°–57° C. at 1.5 mm. mercury pressure and a refractive index ($n_D^{20}$) of 1.4012 to 1.4052. Infra-red analysis of this product showed an absorption band at 5.57 microns indicative of a $CF_2=CF-$group, which absorption band was not present in the infra-red spectrum of the starting material. The product is identified as the pentachloroperfluorodecene having the formula $CF_2=CF-(CF_2CFCl)_4-Cl$.

By employing the reaction illustrated in the preceding three examples, the preferred perfluorochloroolefins can be prepared. These preferred olefins have the general formula $CF_2=CF(CF_2CFCl)_x-Cl$ in which $x$ is an integer between 1 and 14.

Where starting compounds having an odd number of carbon atoms are desired, they can be prepared by pyrolyzing a salt of a telomer acid. The telomers described above, are hydrolyzed to the corresponding carboxylic acids by treatment with concentrated sulfuric acid containing sulfur trioxide at elevated temperatures. By proper control of the temperature, duration of treatment and concentration of the fuming sulfuric acid, monoacids are produced.

Formation of the monoacids of the telomers described above, and particularly telomers having the formula $Cl-(CF_2-CFCl)_n-Cl$, is accomplished by hydrolyzing the telomer with concentrated sulfuric acid containing from substantially 0 to 70 percent excess $SO_3$ at a temperature ranging from about 140° C. to about 300° C. for a period ranging from about 5 to about 50 hours. In general, the lower concentration of fuming sulfuric acid (containing about 0 to about 20 percent $SO_3$), lower temperatures (between about 140 and about 210° C.) and shorter reaction times (5 to 25 hours) are sufficient to hydrolyze the $CFCl_2$ group to COOH, the diacid being formed in lower yield if at all, under such conditions. The monoacid thus produced is then neutralized to a phenolphthalein end point with sodium hydroxide in aqueous solution to yield a sodium salt. Pyrolysis of the sodium salt yields a perfluorochloroolefin containing one less carbon atom in the chain than the starting telomer product. The following examples illustrate the preparation of perfluorochloroolefins containing an odd number of carbon atoms.

EXAMPLE XXVII

*Preparation of 4,6,7-trichloroperfluoroheptene-1*

A mixture containing 161 grams (0.3 mole, 86 ml.) of $Cl(CF_2CFCl)_4Cl$, (B.P. 125° C./10 mm.) and 200 ml. of 20 percent fuming sulfuric acid was heated with stirring at reflux temperature for 46 hours. The viscous lower layer was diluted with carbon tetrachloride, washed with 25 percent hydrochloric acid, and dissolved to yield 85 grams (50 percent yield of acidic material 150–160° C./10 mm.). The product was identified by analysis as the monocarboxylic acid having the formula $$Cl(CF_2CFCl)_3CF_2-COOH$$

This acid was dissolved in water by warming to 40–50° C. on a hot plate and neutralized to a phenolphthalein end point with a 5 percent sodium hydroxide solution. The resulting solution was concentrated in a stream of nitrogen gas and dried at 165° C. This sodium salt was then pyrolyzed in a round bottom flask equipped with a Claisen head to which a condenser was attached. The product was collected in a 2-necked flask and was washed with ferrous solvent and sodium bicarbonate. After washing, the product was dried over magnesium sulfate and distilled. Most of the product distilled between a pot temperature 200–270° C. This olefin had a formula $$Cl(CF_2CFCl)_2CF_2-CF=CF_2$$

and a refractive index of 1.3640.

EXAMPLE XXVIII

*Preparation of 4,6,8,9-tetrachloroperfluorononene-1*

A mixture of $Cl(CF_2CFCl)_5Cl$, (640 grams, 0.98 mole) and 500 mls. of 10 percent fuming sulfuric acid was heated to 215° C. with stirring for 24 hours. The product was isolated by extracting the crude reaction mixture with 1,1,2-trichlorotrifluoroethane for 48 hours. The extract was washed with 25 percent HCl, concentrated and distilled through an 18″ heated jacketed spiral column. A mixture of monoacid and diacid was obtained. The monoacid $Cl(CF_2CFCl)_4CF_2COOH$ had a boiling point of 124–126° C. at 0.2 mm. of mercury, whereas the diacid had a boiling point of 155–159° C. at 0.06 mm. of mercury. The monoacid was separated from the diacid by distillation. The monoacid was neutralized to a phenolphthalein end point with sodium hydroxide dissolved in water. The solution was evaporated to dryness and further dried over night in an oven at 95–100° C. The dried sodium salt $Cl(CF_2CFCl)_4CF_2COONa$ was pyrolyzed in a 500 ml. round bottom flask equipped with a Claisen head to which a condenser was attached. The product was collected in a 2-necked glass flask. The salt was heated in an oil bath and at 260° C. the pyrolyzate began to distill. The reaction was run for three hours at a temperature of 260–285° C. The house vacuum was applied to the receiver during the last portion of the pyrolysis. The liquid product collected was then redistilled to yield an olefin having the formula $$Cl(CF_2CFCl)_3CF_2\text{---}CF\text{=}CF_2$$

and a refractive index of 1.3780 and a boiling point of about 114° C. at 20.5 mm. of mercury.

EXAMPLE XXIX

*Preparation of 4,6,8,10,11-pentachloro-perfluorohendecene-1*

A distilled mixture containing 907 grams of sulfuryl chloride telomer oil (boiling point 65–100° C./0.1 mm.) containing predominantly $Cl(CF_2CFCl)_6Cl$, 480 mls. concentrated sulfuric acid and 520 mls. of 20 percent fuming sulfuric acid was hydrolyzed at about 230° C. for about 30 hours. Upon completion of the reaction, the mixture was made basic with sodium hydroxide and extracted with hexane to remove starting material (only a trace was recovered). The basic solution was then acidified with sulfuric acid and continuously extracted with ether. Concentration of the ether solution yielded 580 grams of extract which was diluted with methylene chloride, filtered, washed with a 1:1 aqueous solution of hydrochloric acid and distilled to yield the monoacid boiling at about 87° C./0.04 mm.–114° C./0.08 mm. and having a neutral equivalent of about 462 and the diacid which had a boiling point of about 140° C. at 0.08 mm. and a neutralization equivalent of 323. The monoacid was neutralized with an aqueous solution of sodium hydroxide to a phenolphthalein end point. The neutral solution was evaporated to dryness and dried in an oven over night. The dried sodium salt $Cl(CF_2\text{---}CFCl)_5\text{---}CF_2COONa$ was pyrolyzed in a round bottom flask equipped with a Claisen head to which a condenser was attached. The product was collected in a 2-necked glass flask and was washed, dried and distilled to yield an olefin having the formula $Cl(CF_2CFCl)_4CF_2\text{---}CF\text{=}CF_2$ which had a boiling point of about 133° C. at 5.9 mm. of mercury and a refractive index of 1.3876.

By employing the procedure given in Examples XXVII to XXIX, the preferred perfluorochloroolefins, having an odd number of carbon atoms in the chain and the formula $Cl(CF_2CFCl)_xCF_2\text{---}CF\text{=}CF_2$ in which $x$ is an integer from 1:12, can be prepared.

From the foregoing description it is apparent that a variety of fluorine containing aliphatic sultones and carbyl sulfates can be prepared such as perfluorohalo aliphatic sultones and carbyl sulfates in which the halo group can be fluorine, chlorine or bromine as for example in tetrafluoroethane sultone and carbyl sulfate and in which the aliphatic chain can be a straight chain or a cyclic compound as in perfluorocyclobutane sultone and carbyl sulfate. Within this group the perfluorohaloalkane sultones and carbyl sulfates are of prime importance because of their utility as surfactants in oxidizing media and preferably in this respect, the perfluorochloroalkane sultones and carbyl sulfates. The perfluorochloroalkane sultones and carbyl sulfates having the general formula $$Cl(C_2F_3Cl)_xCnF_{2n-1}(SO_3)_y$$

in which $x$ is an integer from 1 to 14, $n$ is an integer from 2 to 3 and $y$ is an integer from 1 to 2. Within this general formula are the odd numbered carbon chains which have the general formula $$Cl(CF_2CFCl)_xCF_2CFCF_2(SO_3)_y$$

in which $x$ is an integer from 1 to 12 and $y$ is an integer from 1 to 2 and the even numbered carbon chains which have the general formula $Cl(CFClCF_2)_xCFCF_2(SO_3)_y$, in which $x$ is an integer from 1 to 14 and $y$ is an integer from 1 to 2.

Various alterations and modifications of the invention and its aspects may become apparent to those skilled in the art without departing from the scope of this invention.

Having thus described our invention, we claim:

1. A perfluorohaloalkane carbyl sulfate having 2 to 31 carbon atoms per molecule and in which the halogens are selected from the group consisting of fluorine, chlorine and bromine.
2. A perfluorochloroalkane carbyl sulfate having 2 to 31 carbon atoms per molecule.
3. Trifluorochloroethane carbyl sulfate.
4. Dichloroperfluorobutane carbyl sulfate.
5. Trichloroperfluoroheptane carbyl sulfate.
6. Tetrachloroperfluorononane carbyl sulfate.
7. Pentachloroperfluorohendecane carbyl sulfate.
8. A process for preparing a perfluorohaloalkane carbyl sulfate which comprises reacting a perfluorohaloalkene having 2 to 31 carbon atoms per molecule and in which the halogens are selected from the group consisting of fluorine, chlorine and bromine with sulfur trioxide at a temperature between about −100 and about 200° C., the mol ratio of fluorinated starting compound to sulfur trioxide being between about 1:100 and about 15:1.
9. A process for preparing a perfluorochloroalkane carbyl sulfate which comprises reacting a perfluorochloroalkene having 2 to 31 carbon atoms per molecule with sulfur trioxide at a temperature between about −100 and about 200° C., the mol ratio of fluorinated starting compound to sulfur trioxide being between about 1:100 and about 15:1.

References Cited by the Examiner

UNITED STATES PATENTS 1,913,794  6/33  Daimler et al. _____ 260—327
2,695,308  11/54  Gilbert _____ 260—327 X

FOREIGN PATENTS 124,435  4/59  Russia.

OTHER REFERENCES

Suter et al.: Jour. Amer. Chem. Soc., vol. 65 (1943), page 507.

WALTER A. MODANCE, *Primary Examiner.*

JOHN D. RANDOLPH, *Examiner.*